(12) United States Patent
Ono

(10) Patent No.: US 11,308,367 B2
(45) Date of Patent: Apr. 19, 2022

(54) LEARNING APPARATUS, SYSTEM FOR GENERATING CAPTURED IMAGE CLASSIFICATION APPARATUS, APPARATUS FOR GENERATING CAPTURED IMAGE CLASSIFICATION APPARATUS, LEARNING METHOD, AND PROGRAM

(71) Applicant: Sony Interactive Entertainment Inc., Tokyo (JP)

(72) Inventor: Daichi Ono, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 46 days.

(21) Appl. No.: 16/960,220

(22) PCT Filed: Jan. 26, 2018

(86) PCT No.: PCT/JP2018/002409
§ 371 (c)(1),
(2) Date: Jul. 6, 2020

(87) PCT Pub. No.: WO2019/146057
PCT Pub. Date: Aug. 1, 2019

(65) Prior Publication Data
US 2021/0064912 A1 Mar. 4, 2021

(51) Int. Cl.
*G06K 9/62* (2022.01)
*G06N 3/08* (2006.01)
*G06V 10/40* (2022.01)

(52) U.S. Cl.
CPC .......... *G06K 9/628* (2013.01); *G06K 9/6256* (2013.01); *G06K 9/6261* (2013.01); *G06N 3/08* (2013.01); *G06V 10/40* (2022.01)

(58) Field of Classification Search
None
See application file for complete search history.

(56) References Cited

U.S. PATENT DOCUMENTS 9,665,803 B2 5/2017 Aoba
2014/0198951 A1 7/2014 Aoba
(Continued)

FOREIGN PATENT DOCUMENTS

JP 2014137756 A 7/2014
JP 2016139176 A 8/2016

OTHER PUBLICATIONS

International Preliminary Report on Patentability and Written Opinion for corresponding PCT Application No. PCT/JP2018/002409, 15 pages, dated Aug. 6, 2020.
(Continued)

*Primary Examiner* — Leon Flores
(74) *Attorney, Agent, or Firm* — Matthew B. Dernier, Esq.

(57) ABSTRACT

A classification learning section executes training of a feature quantity extraction section and training of a classification section resulting from a comparison between an output generated when feature quantity data is inputted to the classification section and training data regarding a plurality of classes associated with a source domain training image. A dividing section divides feature quantity data outputted from the feature quantity extraction section in accordance with input of an image into a plurality of pieces of partial feature quantity data corresponding to the image including a feature map of one or more of the classes. A domain identification learning section executes training of the feature quantity extraction section resulting from a comparison between an output generated when partial feature quantity data corresponding to the image is inputted to a domain identification section and data indicating whether the image belongs to a source domain or to the target domain.

7 Claims, 7 Drawing Sheets

(56) References Cited

U.S. PATENT DOCUMENTS

| | | | | |
|---|---|---|---|---|
| 2015/0199617 A1* | 7/2015 | Kuwajima | ............. | G06N 20/00 |
| | | | | 706/20 |
| 2018/0174071 A1* | 6/2018 | Bhatt | ..................... | G06N 20/20 |
| 2018/0330205 A1* | 11/2018 | Wu | ....................... | G06K 9/6288 |
| 2019/0180136 A1* | 6/2019 | Bousmalis | ................ | G06T 7/74 |

OTHER PUBLICATIONS

International Search Report for corresponding PCT Application No. PCT/JP2018/002409, 4 pages, dated May 1, 2018.

Hideki Nakayama, "Image feature extraction and transfer learning using deep convolutional neural networks" IEICE Technical Report, vol. 115, No. 146, pp. 55-59 Jul. 9, 2015. (for relevancy see International Search Report for corresponding PCT Application No. PCT/JP2018/002409, 4 pages dated May 1, 2018).

Chainer, Ysasaki6023, "Fine Tuning with chainer" URL: Https://qiita.com/ysasaki6023/items/3040fe3896fe1ed844c3> 4 pages, Dec. 31, 2016 (for relevancy see International Search Report for corresponding PCT Application No. PCT/JP2018/002409, 4 pages, dated May 1, 2018).

* cited by examiner

LEARNING APPARATUS, SYSTEM FOR GENERATING CAPTURED IMAGE CLASSIFICATION APPARATUS, APPARATUS FOR GENERATING CAPTURED IMAGE CLASSIFICATION APPARATUS, LEARNING METHOD, AND PROGRAM

TECHNICAL FIELD

The present invention relates to a learning apparatus, a system for generating a captured image classification apparatus, an apparatus for generating a captured image classification apparatus, a learning method, and a program.

BACKGROUND ART

There is a known domain adaptation technology for performing a process of classifying an image belonging to a target domain into a plurality of classes by using a machine learning model trained by a training image belonging to a source domain. Here, a semantic segmentation process may be cited as an example of a process of classifying an image into a plurality of classes. The semantic segmentation process identifies, for example, the meaning of each pixel included in an inputted image, such as an object indicated by a pixel. Other examples of the process of classifying into a plurality of classes may be an image classification process of identifying an inputted image and an image detection process of identifying an object depicted in an inputted image and the location of the depicted object.

In domain adaptation, first of all, supervised learning of a training image belonging to the source domain is executed. In this instance, for example, a feature quantity extraction section included in an untrained classification apparatus outputs feature quantity data including a feature map corresponding to each of a given plurality of classes in accordance with an input of a training image. The feature quantity data outputted from the feature quantity extraction section in the above-described manner is inputted to a classification section included in the classification apparatus. In accordance with an input of the feature quantity data, the classification section outputs the result of a process of classifying the training image into the plurality of classes. Then, in accordance with the result of comparison between the outputted result of classification processing and training data regarding the plurality of classes associated with the training image, training of the feature quantity extraction section and classification section is executed.

Subsequently, unsupervised learning is executed by using a training image belonging to the source domain and a training image belonging to the target domain. This unsupervised learning requires data indicating whether a training image belongs to the source domain or the target domain, but does not require the training data regarding the above-mentioned plurality of classes.

In the above-mentioned unsupervised learning, the feature quantity extraction section included in the classification apparatus outputs the above-mentioned feature quantity data in accordance with an input of a training image. The feature quantity data is inputted to a domain identification section that distinguishes between an image belonging to the source domain and an image belonging to the target domain. Subsequently, in accordance with the result of comparison between an output generated when the feature quantity data is inputted to the domain identification section and data indicating whether the training image belongs to the source domain or the target domain, training of the feature quantity extraction section and domain identification section is executed.

SUMMARY

Technical Problems

In the past, the feature quantity data including a feature map corresponding to each of the given plurality of classes in the above-mentioned unsupervised learning was wholly inputted to the domain identification section by the domain adaptation technology.

Consequently, in the above-mentioned unsupervised learning, the training of the feature quantity extraction section and domain identification section was not sufficiently accurate. As a result, the classification of images belonging to the target domain was not sufficiently accurate in some cases.

Further, previously proposed domain adaptation technologies did not deal with a process of classifying captured images in a manner suitable for the environment of each of a plurality of users by using a machine learning model trained by a CG (Computer Graphics) image.

The present invention has been made in view of the above circumstances. An object of the present invention is to provide a learning apparatus, a learning method, and a program that are capable of improving the accuracy of classification of images belonging to the target domain.

Another object of the present invention is to provide a system and apparatus for generating a captured image classification apparatus capable of generating a captured image classification apparatus for executing a process of classifying captured images into a plurality of classes in a manner suitable for the environment of each of a plurality of users by using a machine learning model trained by a CG image.

Solution to Problems

In order to solve the above problems, a learning apparatus according to the present invention executes training of a classification apparatus including a feature quantity extraction section and a classification section. The feature quantity extraction section outputs feature quantity data including a feature map corresponding to each of a given plurality of classes in accordance with an input of an image. The classification section outputs the result of a process of classifying the image into the plurality of classes in accordance with an input of the feature quantity data. The learning apparatus includes a classification learning section, a dividing section, and a domain identification learning section. The classification learning section executes training of the feature quantity extraction section and training of the classification section in accordance with the result of comparison between an output generated when the feature quantity data, which is outputted from the feature quantity extraction section in accordance with an input of a classification training image belonging to a source domain, is inputted to the classification section and training data regarding the plurality of classes associated with the classification training image. The dividing section divides the feature quantity data, which is outputted from the feature quantity extraction section in accordance with an input of a domain training image belonging to either the source domain or a target domain, into a plurality of pieces of partial feature quantity data corresponding to the domain training image including the feature map of one of or a plurality of the classes. The domain identification learning section executes training of the feature quantity extraction section in accordance with the result of comparison between an output generated when the partial feature quantity data corresponding to the domain training image is inputted to a domain identification section, which distinguishes between an image belonging to the source domain and an image belonging to the target domain, and data indicating whether the domain training image belongs to the source domain or the target domain.

In one aspect of the present invention, the domain identification learning section executes the training of the feature quantity extraction section in accordance with the weighted sum of objective function values corresponding to an output that is generated when each of a plurality of pieces of the partial feature quantity data is inputted to the domain identification section.

Alternatively, the domain identification section includes a plurality of subdomain identification sections corresponding to the plurality of pieces of the partial feature quantity data, which are obtained by division by the dividing section, and executes the training of the feature quantity extraction section in accordance with an output that is generated when the partial feature quantity data is inputted to the subdomain identification sections corresponding to the partial feature quantity data.

A system for generating a captured image classification apparatus according to the present invention includes a server and a plurality of apparatuses. The server includes a transmission section that transmits a machine learning model trained by a CG image to each of the plurality of apparatuses. The machine learning model includes a CG feature quantity extraction section and a classification section. The CG feature quantity extraction section outputs feature quantity data including a feature map corresponding to each of a given plurality of classes in accordance with an input of the CG image. The classification section outputs the result of a process of classifying an image, which is inputted to the feature quantity extraction section in accordance with an input of the feature quantity data, into the plurality of classes. Each of the plurality of apparatuses includes a reception section, a learning section, and a generation section. The reception section receives the machine learning model transmitted from the server. The learning section executes training of a captured image feature quantity extraction section in accordance with an image captured in the environment of a user using the apparatus and with the trained machine learning model. The captured image feature quantity extraction section outputs feature quantity data including a feature map corresponding to each of a given plurality of classes in accordance with an input of the image captured in the environment of the user. The generation section generates a captured image classification apparatus in accordance with the trained captured image feature quantity extraction section and with the trained classification section included in the machine learning model. The captured image classification apparatus executes a process of classifying the image captured in the environment of the user into the plurality of classes.

In addition, an apparatus for generating a captured image classification apparatus according to the present invention includes a reception section, a learning section, and a generation section. The reception section receives a machine learning model that is trained by a CG image and transmitted from a server. The machine learning model includes a CG feature quantity extraction section and a classification section. The CG feature quantity extraction section outputs feature quantity data including a feature map corresponding to each of a given plurality of classes in accordance with an input of the CG image. The classification section outputs the result of a process of classifying an image, which is inputted to the feature quantity extraction section in accordance with an input of the feature quantity data, into the plurality of classes. The learning section executes training of a captured image feature quantity extraction section in accordance with an image captured in the environment of a user and with the trained machine learning model. The captured image feature quantity extraction section outputs feature quantity data including a feature map corresponding to each of a given plurality of classes in accordance with an input of the image captured in the environment of the user. The generation section generates a captured image classification apparatus in accordance with the trained captured image feature quantity extraction section and with the trained classification section included in the machine learning model. The captured image classification apparatus executes a process of classifying the image captured in the environment of the user into the plurality of classes.

Further, a learning method according to the present invention executes training of a classification apparatus that includes a feature quantity extraction section and a classification section. The feature quantity extraction section outputs feature quantity data including a feature map corresponding to each of a given plurality of classes in accordance with an input of an image. The classification section outputs the result of a process of classifying the image into the plurality of classes in accordance with an input of the feature quantity data. The learning method includes a step of executing training of the feature quantity extraction section and training of the classification section in accordance with the result of comparison between an output generated when the feature quantity data, which is outputted from the feature quantity extraction section in accordance with an input of a classification training image belonging to a source domain, is inputted to the classification section and training data regarding the plurality of classes associated with the classification training image, a step of dividing the feature quantity data, which is outputted from the feature quantity extraction section in accordance with an input of a domain training image belonging to either the source domain or a target domain, into a plurality of pieces of partial feature quantity data corresponding to the domain training image including the feature map of one of or a plurality of the classes, and a step of executing training of the feature quantity extraction section in accordance with the result of comparison between an output generated when the partial feature quantity data corresponding to the domain training image is inputted to a domain identification section, which distinguishes between an image belonging to the source domain and an image belonging to the target domain, and data indicating whether the domain training image belongs to the source domain or the target domain.

Furthermore, a program according to the present invention causes a computer to execute training of a classification apparatus that includes a feature quantity extraction section and a classification section. The feature quantity extraction section outputs feature quantity data including a feature map corresponding to each of a given plurality of classes in accordance with an input of an image. The classification section outputs the result of a process of classifying the image into the plurality of classes in accordance with an input of the feature quantity data. The program causes the computer to execute the steps of executing training of the feature quantity extraction section and training of the classification section in accordance with the result of comparison between an output generated when the feature quantity data, which is outputted from the feature quantity extraction section in accordance with an input of a classification training image belonging to a source domain, is inputted to the classification section and training data regarding the plurality of classes associated with the classification training image; dividing the feature quantity data, which is outputted from the feature quantity extraction section in accordance with an input of a domain training image belonging to either the source domain or a target domain, into a plurality of pieces of partial feature quantity data corresponding to the domain training image including the feature map of one of or a plurality of the classes; and executing training of the feature quantity extraction section in accordance with the result of comparison between an output generated when the partial feature quantity data corresponding to the domain training image is inputted to a domain identification section, which distinguishes between an image belonging to the source domain and an image belonging to the target domain, and data indicating whether the domain training image belongs to the source domain or the target domain.

DESCRIPTION OF EMBODIMENT

An embodiment of the present invention will now be described in detail with reference to the accompanying drawings.

Figure 1:
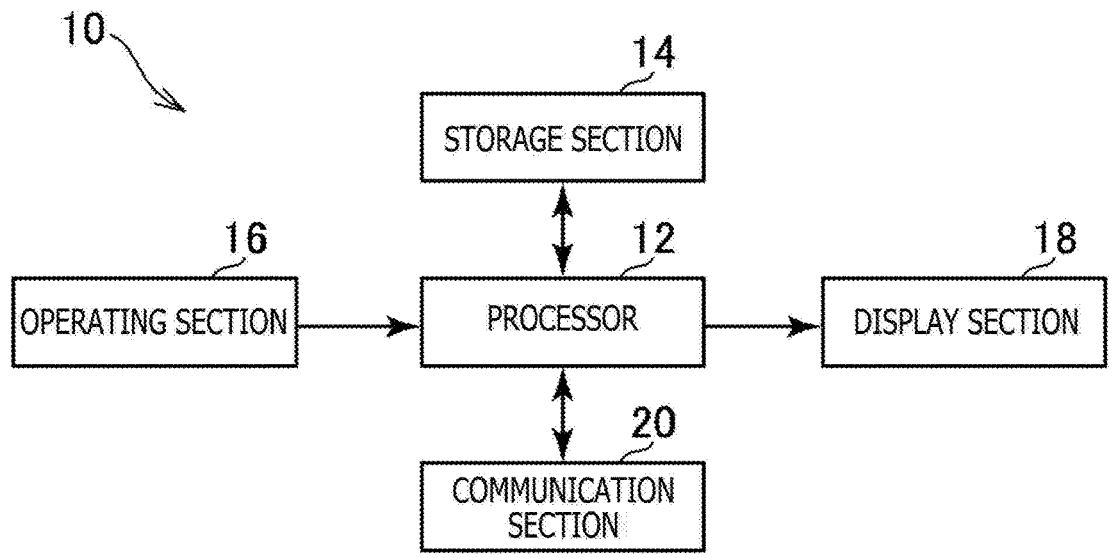
FIG. 1 is a diagram illustrating a configuration of an image processing apparatus according to an embodiment of the present invention.

FIG. 1 is a diagram illustrating a configuration of an image processing apparatus 10 according to the embodiment of the present invention. The image processing apparatus 10 according to the present embodiment is, for example, a computer such as a game console or a personal computer. As depicted in FIG. 1, the image processing apparatus 10 according to the present embodiment includes, for example, a processor 12, a storage section 14, an operating section 16, a display section 18, and a communication section 20.

The processor 12 is a CPU (Central Processing Unit) or another program control device that operates in accordance, for example, with a program installed in the image processing apparatus 10.

The storage section 14 is, for example, a hard disk drive or a storage element such as a ROM (Read-Only Memory) or a RAM (Random-Access Memory). The storage section 14 stores, for example, a program that is to be executed by the processor 12.

The operating section 16 is a user interface such as a keyboard, a mouse, or a game console controller. The operating section 16 receives an operation input from a user, and outputs a signal indicative of the received operation input to the processor 12.

The display section 18 is a liquid-crystal display or another display device adapted to display various images in accordance with instructions from the processor 12.

The communication section 20 is, for example, a communication interface such as a network board or a wireless LAN (Local Area Network) module.

The image processing apparatus 10 may include, for example, a USB (Universal Serial Bus) port and an optical disk drive for reading optical disks such as DVD-ROM (Digital Versatile Disc-Read Only Memory) and Blu-ray (registered trademark) discs.

In the image processing apparatus 10 according to the present embodiment, a domain adaptation technology is exercised to execute a process of classifying images belonging to a target domain into a plurality of classes by using a machine learning model trained by a training image belonging to a source domain. More specifically, a machine learning model trained by computer graphics (CG) images is used to perform semantic segmentation regarding captured images. It is to be noted that the image processing apparatus 10 according to the present embodiment is applicable not only to sematic segmentation, but also, for example, to image classification for identifying an inputted image and to image detection for identifying an object depicted in an inputted image and the location of the depicted object.

An example of implementation of machine learning model training in the image processing apparatus 10 according to the present embodiment will now be described.

Figure 2:
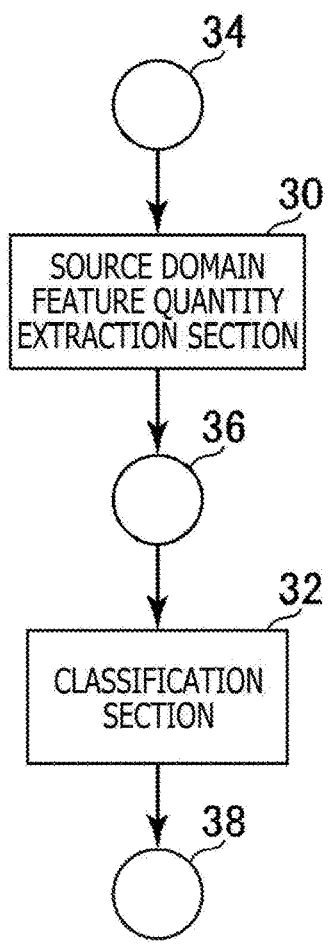
FIG. 2 is a diagram illustrating an example of classification learning in the image processing apparatus according to the embodiment of the present invention.

First of all, as indicated in FIG. 2, in the present embodiment, supervised learning is conducted by training a source domain feature quantity extraction section 30 and a classification section 32 through the use of an image belonging to the source domain. The source domain feature quantity extraction section 30 is implemented in such a manner as to include, for example, a convolution layer and a pooling layer, which are within a convolutional neural network (CNN). Further, the source domain feature quantity extraction section 30 may include a deconvolution layer within the CNN. The classification section 32 is implemented in such a manner as to include, for example, a convolution layer, a pooling layer, and a fully-connected layer, which are within the CNN.

The above-mentioned supervised learning is hereinafter referred to as classification learning. Further, an image belonging to the source domain used for classification learning is hereinafter referred to as a source classification training image. As mentioned above, a CG image may be cited as an example of the source classification training image.

In classification learning, a source classification training image is inputted to the source domain feature quantity extraction section 30 as an input 34. The source domain feature quantity extraction section 30 then outputs feature quantity data 36 including a feature map corresponding to each of a given plurality of classes in accordance with the input of the source classification training image. Here, each of the plurality of classes is associated with the meaning of a pixel, such as an object represented by the pixel, which is estimated on each pixel included in an image targeted, for example, for semantic segmentation.

In the present embodiment, it is assumed that, for example, the size of the feature quantity data 36 is W×H×n. For example, the value W indicates the number of horizontal pixels in the source classification training image, the value H indicates the number of vertical pixels in the source classification training image, and the value n indicates the number of the above-mentioned given plurality of classes. That is to say, the outputted feature quantity data 36 includes feature maps that are equal in size to the source classification training image, and the number of feature maps is the same as the number of classes.

Subsequently, the feature quantity data 36 outputted from the source domain feature quantity extraction section 30 is inputted to the classification section 32. The classification section 32 generates and delivers an output 38 in accordance with the input of the feature quantity data 36. The output 38 is data indicating the possibility that each pixel in the source classification training image belongs to each of the classes. The output 38 associated with one pixel is expressed, for example, as a vector including n elements u1(k1) (k1=1 to n). The value n is the number of classes, and the value k1 is a number (class identifier) associated with a class.

In the present embodiment, the output 38 is then compared with training data that is associated with the source classification training image. Here, the training data is expressed by a one-of-n vector that is associated with each pixel. For example, the training data regarding a pixel belonging to a class identified by a class identifier of j1 is expressed as a vector d1 having n elements in which the j1st element is 1 and all the other elements are 0.

In the above instance, the result of comparison between the output 38 and the training data associated with the source classification training image may be expressed as an objective function value L1. For example, the value L1 in Equation (1) below may be regarded as the objective function value L1. It is to be noted that, in Equation (1), the value x is an x-coordinate value of the source classification training image, and the value y is a y-coordinate value of the source classification training image. The value d1(j1) (x, y) is a value of the j1st element of training data corresponding to a pixel having the coordinate value (x, y) in the source classification training image. The value p1(j1) (x, y) is a value of the j1st element of a soft-max cross entropy corresponding to a pixel having the coordinate value (x, y) in the source classification training image.

[Math 1]

$$L1 = \frac{-\sum_{y=1}^{H}\sum_{x=1}^{W}\sum_{j1=1}^{n} d1(j1)(x, y)\log p1(j1)(x, y)}{WH} \quad (1)$$

In the above instance, as indicated in Equation (1), for example, the product of the value d1(j1) (x, y) of an element of training data corresponding to a pixel having the coordinate value (x, y) in the source classification training image and the logarithm of the value p1(j1) (x, y) of the soft-max cross entropy is calculated on an individual class basis. The sum of the products calculated for the individual classes is then calculated. Subsequently, the sum of the products calculated for the individual pixels included in the source classification training image is divided by the product of W and H to obtain an averaged value, and then the objective function value L1 is calculated by inverting the sign of the averaged value.

In the above instance, for example, the value p1(j1) of the soft-max cross entropy is calculated by Equation (2) below.

[Math 2]

$$p1(j1) = \frac{\exp(u1(j1))}{\sum_{k1=1}^{n} \exp(u1(k1))} \quad (2)$$

As indicated in Equation (2), the value p1(j1) of the soft-max cross entropy is determined, for example, by dividing the value of an exponential function with an argument equivalent to the value of the j1st element u1(j1) of the output 38 by the sum of values of exponential functions of individual elements with an argument equivalent to the value of the element u1 of the output 38.

In the present embodiment, the values of parameters such as a weighting factor for elements included in the source domain feature quantity extraction section 30 and classification section 32 are changed so as to minimize the objective function value L1 which is calculated in accordance with the input of the source classification training image. Further, in the present embodiment, training of the source domain feature quantity extraction section 30 and classification section 32 is executed, for example, by changing the values of parameters of the elements included in the source domain feature quantity extraction section 30 and classification section 32 in accordance with the input of a plurality of source classification training images.

Figure 3:
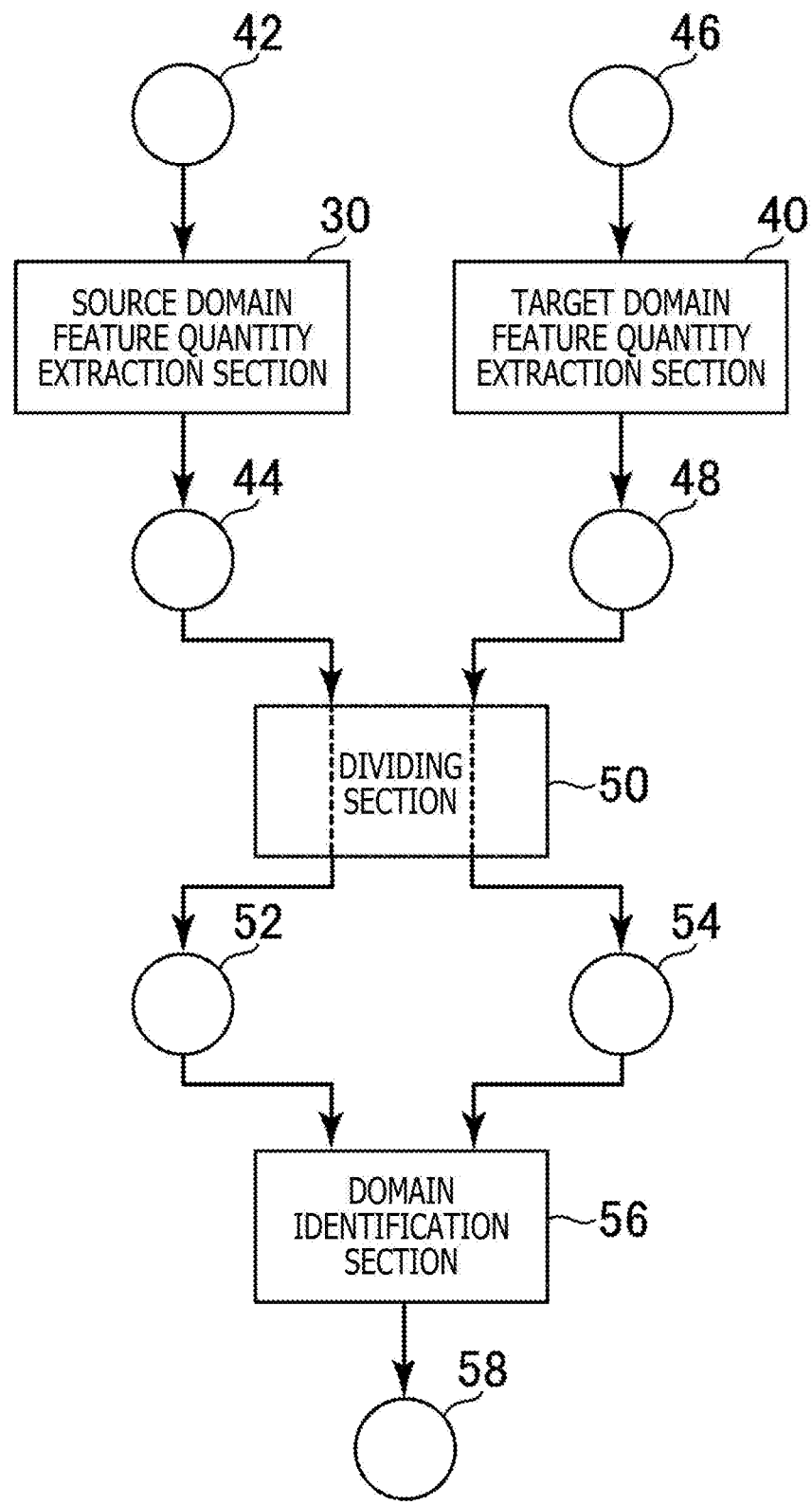
FIG. 3 is a diagram illustrating an example of domain identification learning in the image processing apparatus according to the embodiment of the present invention.

Subsequently to the above-described classification learning, unsupervised learning is conducted, as depicted in FIG. 3, by using an image belonging to the source domain and an image belonging to the target domain. The above-mentioned unsupervised learning is hereinafter referred to as domain identification learning. Further, an image belonging to the source domain and used for domain identification learning is hereinafter referred to as a source domain training image, and an image belonging to the target domain and used for domain identification learning is hereinafter referred to as a target domain training image. As mentioned earlier, a CG image may be cited as an example of the source domain training image, and a captured image may be cited as an example of the target domain training image. The source classification training image used for classification learning may alternatively be used as the source domain training image.

The following describes a case where an ADDA (Adversarial Discriminative Domain Adaptation) technology is used as an example of domain identification learning. It is to be noted that an example of implementation of domain identification learning, which is described below, is merely an example of implementation of domain identification learning. Some other technologies may be used for the implementation of domain identification learning.

In an initial state of domain identification learning, a copy of the source domain feature quantity extraction section 30 is set as a target domain feature quantity extraction section 40. More specifically, in the initial state, the values of parameters of individual elements included in the target domain feature quantity extraction section 40 are the same as those of individual elements included in the source domain feature quantity extraction section 30.

In domain identification learning, the source domain training image is inputted to the source domain feature quantity extraction section 30 as an input 42. Then, the source domain feature quantity extraction section 30 outputs feature quantity data 44 including a feature map corresponding to each of the above-mentioned given plurality of classes in accordance with the input of the source domain training image. Further, the target domain training image is inputted to the target domain feature quantity extraction section 40 as an input 46. Then, the target domain feature quantity extraction section 40 outputs feature quantity data 48 including a feature map corresponding to each of the above-mentioned given plurality of classes in accordance with the input of the target domain training image.

In the present embodiment, it is assumed here that the source domain training image and the target domain training image have the same number of pixels as the source classification training image, that is, the same of W×H. Further, it is assumed that the sizes of the feature quantity data 44 and feature quantity data 48 are X×H×n. Here, for example, the value W indicates the number of horizontal pixels in the source domain training image and the target domain training image, the value H indicates the number of vertical pixels in the source domain training image and the target domain training image, and the value n indicates the number of the above-mentioned classes.

Subsequently, a dividing section 50 divides the feature quantity data 44 outputted from the source domain feature quantity extraction section 30 into a plurality of pieces of partial feature quantity data 52 including a feature map of one of or a plurality of the classes. Further, the dividing section 50 divides the feature quantity data 48 outputted from the target domain feature quantity extraction section 40 into a plurality of pieces of partial feature quantity data 54 including a feature map of one of or a plurality of the classes. Here, it is assumed, for example, that the feature quantity data 44 is divided into n pieces equivalent to the number of classes, in order to generate n pieces of partial feature quantity data 52 including a feature map of one class having a size of W×H. Further, it is assumed that the feature quantity data 48 is similarly divided into n pieces equivalent to the number of classes, in order to generate n pieces of partial feature quantity data 54 including a feature map of one class having a size of W×H.

Subsequently, in the present embodiment, for example, the partial feature quantity data 52 or the partial feature quantity data 54 is inputted to a domain identification section 56 that distinguishes between an image belonging to the source domain and an image belonging to the target domain. In accordance with the input of the partial feature quantity data 52 or partial feature quantity data 54, the domain identification section 56 generates and delivers an output 58. The output 58 is data indicating the possibility that the partial feature quantity data 52 is inputted and the possibility that the partial feature quantity data 54 is inputted. More specifically, the domain identification section 56 generates and delivers, as the output 58, the data indicating the possibility that the inputted partial feature quantity data is based on a source domain training image and the possibility that the inputted partial feature quantity data is based on a target domain training image.

For example, in the present embodiment, n pieces of partial feature quantity data 52 generated based on one source domain training image or n pieces of partial feature quantity data 54 generated based on one target domain training image are inputted to the domain identification section 56. The output 58 corresponding to each of the n pieces of partial feature quantity data is then identified. For example, with respect to each pixel in the source domain training image or in the target domain training image, data indicating the possibility of being a pixel in the source domain training image and the possibility of being a pixel in the target domain training image is outputted as the output 58. The output 58 associated with a pixel is expressed, for example, as a vector including two elements u2(k2) (k2=1 or 2). Here, the value k2 is a number (domain identifier) associated with the source domain or the target domain. In this instance, it is assumed that u2(1) indicates the possibility that a relevant pixel is a pixel in the source domain training image, and that u2(2) indicates the possibility that a relevant pixel is a pixel in the target domain training image.

Subsequently, the output 58 generated when the partial feature quantity data 52 or the partial feature quantity data 54 is inputted to the domain identification section 56 is compared with data indicating whether an inputted image is a source domain training image or a target domain training image.

Data indicating whether an image inputted for domain identification learning is a source domain training image or a target domain training image is hereinafter referred to as domain identification data. In this instance, for example, a value associated with the source domain or with the target domain may be set as a value of domain identification data. Here, the value of domain identification data associated with a source domain training image may be expressed by a two-dimensional vector (1, 0), and the value of domain identification data associated with a target domain training image may be expressed by a two-dimensional vector (0, 1).

Subsequently, in the present embodiment, the output 58 is compared with the domain identification data. In this instance, for example, the result of comparison between the domain identification data and the output 58 generated when the partial feature quantity data 52 or partial feature quantity data 54 associated with the ith class is inputted to the domain identification section 56 may be expressed as an objective function value L2(i). For example, the value L2(i) in Equation (3) below may be regarded as the objective function value L2(i). In Equation (3), the value x is an x-coordinate value of the source domain training image or target domain training image, and the value y is a y-coordinate value of the source domain training image or target domain training image. The value d2(j2) is a value of the j2nd element of domain identification data to be compared with the output 58. For example, in a case where the value of domain identification data is (1, 0), the value d2(1) is 1, and the value d2(2) is 0. Further, for example, in a case where the value of domain identification data is (0, 1), the value d2(1) is 0, and the value d2(2) is 1. The value p2(j2) (x, y) is the j2nd element of a soft-max cross entropy corresponding to a pixel having the coordinate value (x, y) in the source domain training image or in the target domain training image.

[Math. 3]

$$L2(i) = \frac{-\sum_{y=1}^{H}\sum_{x=1}^{W}\sum_{j2=1}^{2} d2(j2)\log p2(j2)(x, y)}{WH} \quad (3)$$

In the above instance, as indicated in Equation (3), for example, the product of the value d2(j2) of an element of domain identification data and the logarithm of the value p2(j2) (x, y) of the soft-max cross entropy is calculated on an individual domain basis. The sum of the products calculated for the individual domains is then calculated. Subsequently, the sum of the products calculated for the individual pixels included in the source classification training image is divided by the product of W and H to obtain an averaged value, and then the objective function value L2(i) is calculated by inverting the sign of the averaged value.

In the above instance, the value p2(j2) of the soft-max cross entropy is calculated, for example, by Equation (4) below.

[Math. 4]

$$p2(j2) = \frac{\exp(u2(j2))}{\sum_{k2=1}^{2} \exp(u2(k2))} \quad (4)$$

As indicated in Equation (4), the value p2(j2) of the soft-max cross entropy is determined, for example, by dividing the value of an exponential function with an argument equivalent to the value of the j2nd element u2(j2) of the output 58 by the sum of values of exponential functions of individual elements with an argument equivalent to the value of the element u2 of the output 58.

Subsequently, in the present embodiment, the objective function value L2(i) (i=1 to n) regarding n pieces of partial feature quantity data 52 associated with one source domain training image or n pieces of partial feature quantity data 54 associated with one target domain training image, is calculated.

Subsequently, based on n pieces of objective function values L2(i) calculated in the above-described manner, an objective function value L3 associated with one source domain training image or one target domain training image is calculated. For example, the value L3 in Equation (5) below is equivalent to the objective function value L3. Here, the value a(i) is set as appropriate, for example, by the user, and is representative of the weight applied to the ith class.

[Math. 5]

$$L3 = \sum_{i=1}^{n} a(i)L2(i) \quad (5)$$

As indicated in Equation (5), when, for example, the weight is a(i), the weighted sum of the objective function values L2(i) is the objective function value L3.

In the present embodiment, the values of parameters, such as a weighting factor for elements included in the target domain feature quantity extraction section 40 or the domain identification section 56, are changed so as to optimize the calculated objective function value L3.

In the above instance, for example, the values of parameters of the domain identification section 56 and the values of parameters of the target domain feature quantity extraction section 40 may be changed alternately. The values of parameters of the domain identification section 56 may be changed in such a manner that the values of parameters of the target domain feature quantity extraction section 40 remain unchanged. Further, the values of parameters of the target domain feature quantity extraction section 40 may be changed in such a manner that the values of parameters of the domain identification section 56 remain unchanged.

For example, changes of the values of parameters of the domain identification section 56 through the use of a predetermined number of images and changes of the values of parameters of the target domain feature quantity extraction section 40 through the use of a predetermined number of images may be applied alternately and repeatedly. In such an instance, the values of parameters of the domain identification section 56 may be changed in such a manner as to minimize the calculated objective function value L3. The values of parameters of the target domain feature quantity extraction section 40 may be changed in such a manner as to minimize a value obtained by inverting the plus/minus sign of the calculated objective function value L3 (maximize the objective function value L3).

As described above, domain identification learning according to the present embodiment requires the domain identification data, but does not require training data regarding a plurality of classes, such as the above-mentioned vector d1.

Figure 4:
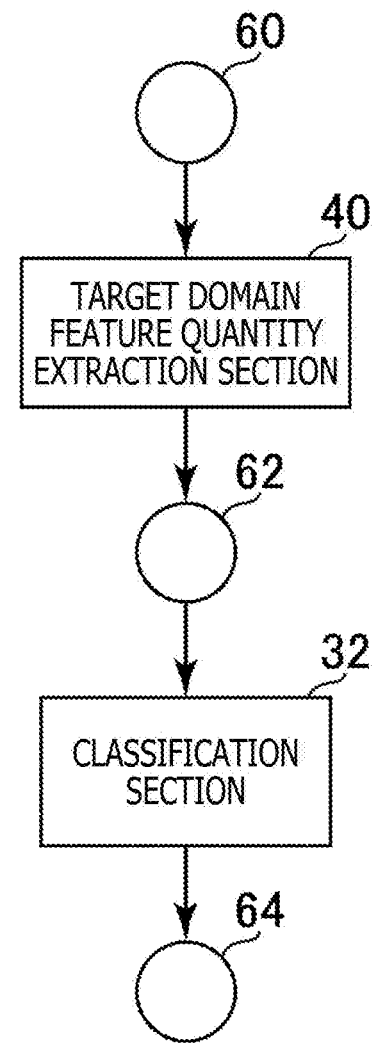
FIG. 4 is a diagram illustrating an example of classification processing in the image processing apparatus according to the embodiment of the present invention.

Subsequently, in the present embodiment, for example, a process of classifying images belonging to the target domain into a plurality of classes by using a classification apparatus that is a machine learning model subjected to the above-described classification learning and domain identification learning is executed, as depicted in FIG. 4.

As depicted in FIG. 4, the classification apparatus according to the present embodiment includes the target domain feature quantity extraction section 40 and the classification section 32. The target domain feature quantity extraction section 40 is subjected to domain identification learning. The classification section 32 is subjected to classification learning.

In classification processing according to the present embodiment, for example, an image belonging to the target domain, which is targeted for the classification processing, is inputted to the target domain feature quantity extraction section 40 as an input 60. The target domain feature quantity extraction section 40 then outputs feature quantity data 62 corresponding to the inputted image. The feature quantity data 62 is then inputted to the classification section 32. Subsequently, in accordance with an output 64 generated when the feature quantity data 62 is inputted to the classification section 32, the classification processing is executed on the image inputted to the target domain feature quantity extraction section 40. In this instance, an image indicating, for example, the result of semantic segmentation performed on the inputted image may be generated.

The image indicating the result of semantic segmentation may be, for example, an image divided, on an individual pixel basis, into a plurality of regions respectively associated with the above-mentioned given plurality of classes. In this instance, each of the regions may be expressed by a color corresponding to the associated class. This enables the user to confirm the class associated with each of the regions, for example, by causing the display section 18 to display the image indicating the result of semantic segmentation. Further, the image may be used as an input for various control functions such as autonomous vehicle driving control.

For example, it is assumed that the feature quantity data 44 or the feature quantity data 48 is inputted to the domain identification section 56 for domain identification learning without being divided by the dividing section 50. In this case, it is also assumed that the output of the domain identification section 56 is expressed, for example, as a vector that corresponds to one source domain training image or one target domain training image and includes two elements u3(k3) (k3=1 or 2).

An objective function value L4 in the above case is calculated, for example, by Equation (6) below. The value d3(j3) is a value of the j3rd element of the domain identification data to be compared with the output of the domain identification section 56. In a case where, for example, the value of the domain identification data is (1, 0), the value d3(1) is 1, and the value d3(2) is 0. Further, in a case where, for example, the value of the domain identification data is (0, 1), the value d3(1) is 0, and the value d3(2) is 1. Moreover, the value p3(j3) is the j3rd element of a soft-max cross entropy corresponding to a source domain training image or a target domain training image.

[Math. 6]

$$L4 = -\sum_{j3=1}^{2} d3(j3) \log p3(j3) \qquad (6)$$

In the above instance, as indicated in Equation (6), for example, the product of the value d3(j3) of an element of domain identification data and the logarithm of the value p3(j3) of the soft-max cross entropy is calculated on an individual domain basis. The sum of the products calculated for the individual domains is then calculated. Subsequently, the objective function value L4 is calculated by inverting the sign of the calculated sum.

In the above instance, the value p3(j3) of the soft-max cross entropy is calculated, for example, by Equation (7) below.

[Math. 7]

$$p3(j3) = \frac{\exp(u3(j3))}{\sum_{k3=1}^{2} \exp(u3(k3))} \qquad (7)$$

As indicated in Equation (7), the value p3(j3) of the soft-max cross entropy is determined, for example, by dividing the value of an exponential function with an argument equivalent to the value of the j3rd element u3(j3) of the output by the sum of values of exponential functions of individual elements with an argument equivalent to the value of the element u3 of the output.

The above-mentioned objective function value L3 corresponds to the objective function value L2(i) that is associated with one image and calculated based on the input of partial feature quantity data corresponding to each class to the domain identification section 56. Meanwhile, the objective function value L4 is calculated based on the input of the whole feature quantity data associated with one image to the domain identification section 56. In this instance, it is conceivable that a feature represented by the partial feature quantity data has a more constant trend than a feature represented by the whole feature quantity data. Therefore, it can be said that an issue to be addressed by the domain identification section 56, that is, whether an inputted image belongs to the source domain or to the target domain, is more simplified in a case where the partial feature quantity data is inputted than in a case where the whole feature quantity data is inputted.

Accordingly, as compared to a case where the whole feature quantity data is used to conduct domain identification learning, the image processing apparatus 10 according to the present embodiment is able to achieve high learning accuracy by conducting domain identification learning with the partial feature quantity data obtained by dividing the feature quantity data. As a result, the image processing apparatus 10 according to the present embodiment is capable of improving the accuracy of classification of images belonging to the target domain.

The objective function value L2(i) based on a square error, which is calculated by Equation (8) below, may be used instead of the objective function value L2(i) indicated in Equation (3) and based on the soft-max cross entropy. For example, the value u2(j2) (x, y) in Equation (8) is a value of the j2nd element of the output 58 corresponding to a pixel having the coordinate value (x, y) in the source domain training image or in the target domain training image.

[Math. 8]

$$L2(i) = \frac{\sum_{y=1}^{H} \sum_{x=1}^{W} \sum_{j2=1}^{2} \|d2(j2) - u2(j2)(x, y)\|^2}{WH} \qquad (8)$$

Further, the domain identification section 56 may include n subdomain identification sections that are associated with the respective classes. The partial feature quantity data 52 or partial feature quantity data 54 associated with the ith class may be inputted to the ith subdomain identification section. Then, training of the ith subdomain identification section may be executed based on the objective function value L2(i). This ensures that the training of a subdomain identification section corresponding to a class is executed. Therefore, high learning accuracy can be achieved in domain identification learning.

Furthermore, instead of the above-mentioned ADDA technology, a technology described in "Ganin, Y. and V. Lempitsky, Unsupervised domain adaptation by backpropagation. arXiv preprint arXiv: 1409.7495, 2014." may be used to conduct identification learning. Additionally, in the above case, the partial feature quantity data may be inputted to the domain identification section 56, as is the case with domain identification learning based on the ADDA technology. When the technology described in "Ganin, Y. and V. Lempitsky, Unsupervised domain adaptation by backpropagation. arXiv preprint arXiv: 1409.7495, 2014." is used, domain identification learning is conducted in such a manner that the values of parameters of elements included in the source domain feature quantity extraction section 30 and the values of parameters of elements included in the target domain feature quantity extraction section 40 are made the same. The above domain identification learning is conducted in such a manner as to cancel a feature quantity that distinguishes between a source domain image and a target domain image. As a result, the classification processing is performed in such a manner that the target domain feature quantity extraction section 40 outputs domain-independent feature quantity data 62.

Moreover, the domain identification learning based on the above technology is conducted so as to train both a feature quantity extraction section 72 and the domain identification section 56 in accordance with the result of comparison between the output of the domain identification section 56 corresponding to one image and the domain identification data corresponding to the image.

Additionally, the image belonging to the source domain and the image belonging to the target domain need not be a CG image and a captured image, respectively. For example, the image belonging to the source domain may be an image captured in a specific season (e.g., an image captured in autumn), and the image belonging to the target domain may be an image captured in a different season (e.g., an image captured in winter). Further, for example, the image belonging to the source domain may be an image captured in a specific country (e.g., an image captured in Japan), and the image belonging to the target domain may be an image captured in a different country (e.g., an image captured in America).

Functions of the image processing apparatus 10 and processes performed by the image processing apparatus 10 will now be further described with special attention paid to classification learning and domain identification learning.

Figure 5:
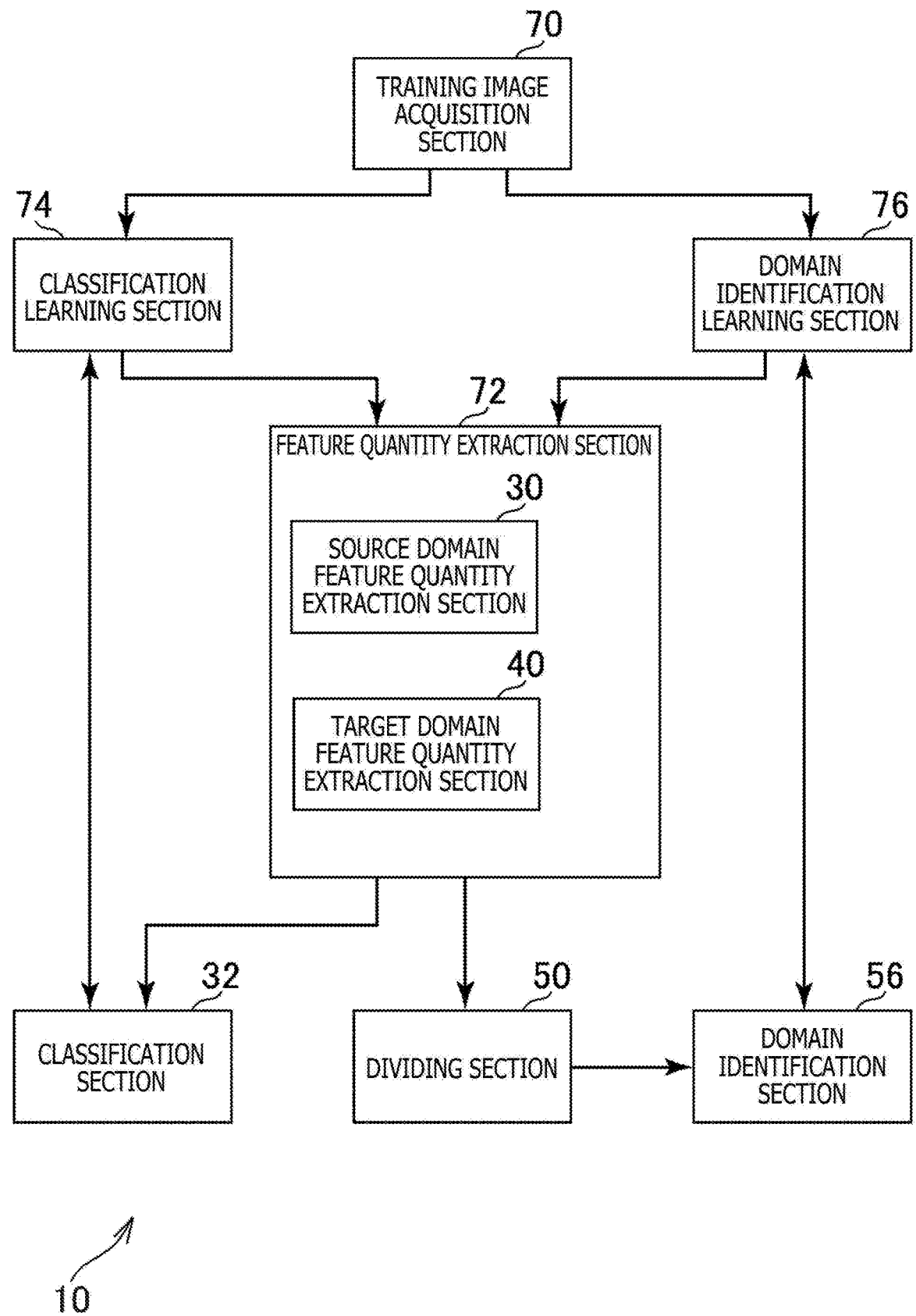
FIG. 5 is a functional block diagram illustrating examples of functions implemented in the image processing apparatus according to the embodiment of the present invention.

FIG. 5 is a functional block diagram illustrating examples of functions implemented in the image processing apparatus 10 according to the present embodiment. All the functions depicted in FIG. 5 need not be implemented in the image processing apparatus 10 according to the present embodiment. Further, functions other than those depicted in FIG. 5 may be implemented in the image processing apparatus 10 according to the present embodiment. For example, the functions of the classification apparatus, which are described with reference to FIG. 4, may be implemented in the image processing apparatus 10 according to the present embodiment.

As depicted in FIG. 5, the image processing apparatus 10 functionally includes, for example, a training image acquisition section 70, the feature quantity extraction section 72, the classification section 32, a classification learning section 74, the dividing section 50, the domain identification section 56, and a domain identification learning section 76. The feature quantity extraction section 72 includes, for example, the source domain feature quantity extraction section 30 and the target domain feature quantity extraction section 40. The above-mentioned elements are mainly implemented in the processor 12 and in the storage section 14.

The above functions may be implemented by allowing the processor 12 to execute a program that includes commands associated with the above functions and is installed in the image processing apparatus 10 which is a computer. The program may be supplied to the image processing apparatus 10 through the Internet or through a computer-readable information storage medium, such as an optical disk, a magnetic disk, a magnetic tape, a magneto-optical disk, or a flash memory.

The training image acquisition section 70 in the present embodiment acquires, for example, a training image that is used to train the machine learning model implemented in the image processing apparatus 10. For example, the training image acquisition section 70 may acquire the above-mentioned source classification training image, source domain training image, and target domain training image.

In accordance with an input of an image, the feature quantity extraction section 72 in the present embodiment outputs, for example, feature quantity data corresponding to the image that includes a feature map corresponding to each of a given plurality of classes. In this instance, the source classification training image or the source domain training image may be inputted to the source domain feature quantity extraction section 30 included in the feature quantity extraction section 72. Subsequently, the source domain feature quantity extraction section 30 may output feature quantity data corresponding to the inputted source domain training image. Further, for example, the target domain training image may be inputted to the target domain feature quantity extraction section 40 included in the feature quantity extraction section 72. Subsequently, the target domain feature quantity extraction section 40 may output feature quantity data corresponding to the inputted target domain training image.

In accordance with an input of feature quantity data corresponding to an image, the classification section 32 in the present embodiment outputs, for example, the result of classification of the image into a plurality of classes. For example, the classification section 32 receives an input of the feature quantity data 36 outputted from the source domain feature quantity extraction section 30 in accordance with an input of the source classification training image. Then, in accordance with the input of the feature quantity data 36, the classification section 32 outputs the result of classification of the source classification training image into the above-mentioned given plurality of classes.

The classification learning section 74 in the present embodiment executes, for example, the above-mentioned classification learning. The classification learning section 74 identifies the result of comparison between an output generated when the feature quantity data 36 corresponding to the source classification training image is inputted to the classification section 32 and training data regarding a plurality of classes associated with the source classification training image. Then, in accordance with the identified result of comparison, the classification learning section 74 executes training of the feature quantity extraction section 72 and training of the classification section 32.

The classification learning section 74 may input the source classification training image to the source domain feature quantity extraction section 30. In such an instance, the source domain feature quantity extraction section 30 may output the feature quantity data 36 corresponding to the source classification training image in accordance with the input of the source classification training image, and may input the feature quantity data 36 to the classification section 32. Subsequently, the classification section 32 may output the result of classification processing on the source classification training image as described above. Then, in accordance with the result represented by the output generated when the feature quantity data 36 outputted from the source domain feature quantity extraction section 30 is inputted to the classification section 32, the classification learning section 74 may execute training of the source domain feature quantity extraction section 30 and training of the classification section 32.

The dividing section 50 in the present embodiment identifies, for example, feature quantity data that is outputted from the feature quantity extraction section 72 in accordance with an input of the source domain training image or target domain training image. Then, the dividing section 50 in the present embodiment divides, for example, the identified feature quantity data into a plurality of pieces of partial feature quantity data that include a feature map of one of or a plurality of classes and correspond to the source domain training image or the target domain training image. In this instance, the feature quantity data may be divided into n pieces as mentioned earlier to generate n pieces of partial feature quantity data that each include a feature map of one class.

Further, for example, the feature quantity data outputted from the feature quantity extraction section 72 may be divided into m pieces of partial feature quantity data each including a feature map of n/m classes. It is assumed that, for example, there are n/2 classes associated with a natural object and n/2 classes associated with an artificial object. In such a case, the feature quantity data may be divided into partial feature quantity data including a feature map of n/2 classes associated with the natural object and partial feature quantity data including a feature map of n/2 classes associated with the artificial object.

The domain identification section 56 in the present embodiment identifies, for example, an image belonging to the source domain and an image belonging to the target domain. The domain identification section 56 receives, for example, an input of one of or a plurality of pieces of partial feature quantity data corresponding to a source domain training image or a target domain training image. Then, in accordance with such an input, the domain identification section 56 outputs data indicating the possibility that the inputted partial feature quantity data is based on the source domain training image and the possibility that the inputted partial feature quantity data is based on the target domain training image.

The domain identification learning section 76 in the present embodiment executes, for example, training of the feature quantity extraction section 72 and domain identification section 56 through the use of a plurality of images.

The domain identification learning section 76 may input, for example, the source domain training image to the source domain feature quantity extraction section 30. In such an instance, the dividing section 50 may divide the feature quantity data 44, which corresponds to the source domain training image outputted from the source domain feature quantity extraction section 30, into a plurality of pieces of partial feature quantity data 52. Further, the domain identification learning section 76 may input, for example, the target domain training image to the target domain feature quantity extraction section 40. In such an instance, the dividing section 50 may divide the feature quantity data 48, which corresponds to the target domain training image outputted from the target domain feature quantity extraction section 40, into a plurality of pieces of partial feature quantity data 54.

Subsequently, the domain identification learning section 76 may input each of the plurality of pieces of partial feature quantity data generated by the dividing section 50 to the domain identification section 56. The domain identification learning section 76 may then execute training of the feature quantity extraction section 72 and domain identification section 56. In such an instance, the training of the feature quantity extraction section 72 and domain identification section 56 may be executed in accordance with the result of comparison between the output from the domain identification section 56, which corresponds to each of a plurality of pieces of partial feature quantity data corresponding to one image, and the domain identification data corresponding to the image. In this instance, as mentioned earlier, the domain identification learning section 76 may execute either the training of the domain identification section 56 or the training of the target domain feature quantity extraction section 40 in accordance with the result of comparison between the domain identification data and the output from the domain identification section 56.

The domain identification learning section 76 need not input the whole partial feature quantity data generated by the dividing section 50 to the domain identification section 56. For example, partial feature quantity data associated with an "other" class which is not classified into any other class need not be inputted to the domain identification section 56.

Further, as indicated in Equation (5), the domain identification learning section 76 may execute the training of the feature quantity extraction section 72 in accordance with the weighted sum of objective function values corresponding to an output that is generated when each of a plurality of pieces of partial feature quantity data is inputted to the domain identification section 56. In such an instance, the weight a(i) of a class having a feature that significantly varies from a CG image to a captured image may be set in such a manner that the weight a(i) of such a class is greater than the weight a(i) of the other classes.

Moreover, as mentioned earlier, the domain identification section 56 may include a plurality of subdomain identification sections that respectively correspond to the plurality of pieces of the partial feature quantity data obtained by division by the dividing section 50. In such an instance, the domain identification learning section 76 may execute the training of the feature quantity extraction section 72 in accordance with an output that is generated when partial feature quantity data is inputted to the subdomain identification sections corresponding to the partial feature quantity data.

Figure 6:
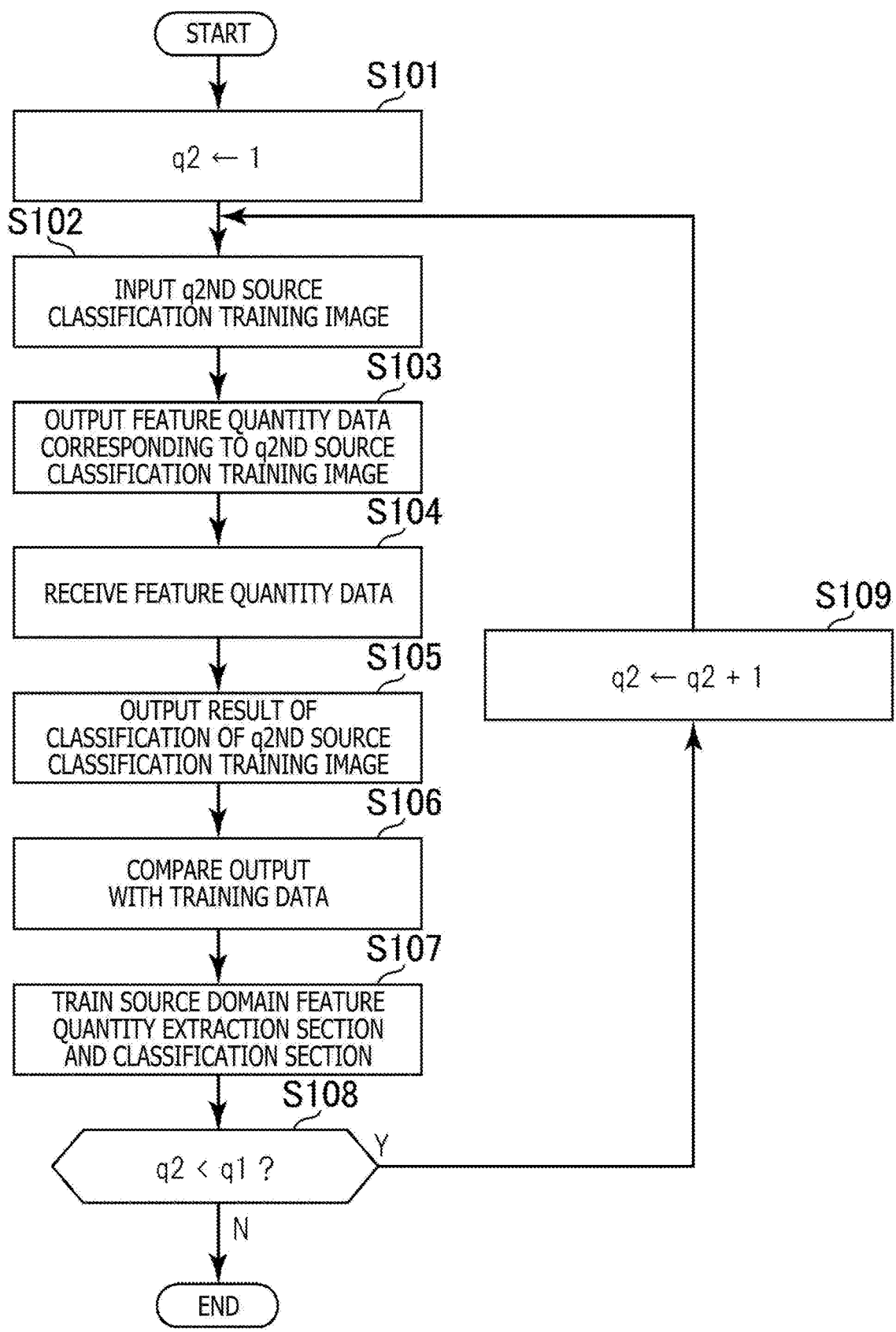
FIG. 6 is a flowchart illustrating an example of a process for classification learning conducted in the image processing apparatus according to the embodiment of the present invention.

The steps of an example of a process for classification learning conducted in the image processing apparatus 10 according to the present embodiment will now be described with reference to a flowchart depicted in FIG. 6. The following description deals with the steps of an example of a process for classification learning that is executed based, for example, on q1 source classification training images.

First of all, the classification learning section 74 sets the value 1 as the value of a variable q2 (step S101).

Next, the classification learning section 74 inputs the q2nd source classification training image to the source domain feature quantity extraction section 30 (step S102).

Subsequently, the source domain feature quantity extraction section 30 outputs the feature quantity data 36 corresponding to the source classification training image inputted in step S102 (step S103).

Next, the classification section 32 receives the feature quantity data 36 that is outputted in step S103 from the source domain feature quantity extraction section 30 (step S104).

Then, in accordance with the feature quantity data inputted in step S104, the classification section 32 outputs the result of a process of classifying the source classification training image inputted in step S102 into the above-mentioned given plurality of classes (step S105).

Next, the classification learning section 74 compares the output generated from the classification section 32 in step S105 with training data associated with the source classification training image inputted in step S102 (step S106). In this instance, for example, the earlier-mentioned objective function value L1 may be calculated.

Then, in accordance with the result of the comparison made in step S106, the classification learning section 74 executes training of the source domain feature quantity extraction section 30 and classification section 32 (step S107). In this instance, for example, the values of parameters of elements included in the source domain feature quantity extraction section 30 and classification section 32 are updated.

Next, the classification learning section 74 determines whether or not the value of the variable q2 is smaller than q1 (step S108). In a case where the value of the variable q2 is smaller than q1 ("Y" at step S108), the classification learning section 74 increases the value of the variable q2 by one (step S109), and then returns to step S102. In a case where the value of the variable q2 is not smaller than q1 ("N" at step S108), the example of the process depicted in FIG. 6 ends.

The steps of an example of a process for domain identification learning conducted in the image processing apparatus 10 according to the present embodiment will now be described with reference to a flowchart depicted in FIG. 7. The following description deals with the steps of an example of a process for domain identification learning that is executed based, for example, on r1 image groups. The r1 image groups each include q3 images. Here, it is assumed that a source domain training image and a target domain training image are included as the images included in the image groups. Further, it is assumed that the value r1 is an even number.

First of all, the domain identification learning section 76 sets the value 1 as the value of a variable q4, and sets the value 1 as the value of a variable r2 (step S201).

Next, the domain identification learning section 76 inputs the q4th image included in the r2nd image group to the feature quantity extraction section 72 (step S202). In this instance, in a case where the image is a source domain training image, it may be inputted to the source domain feature quantity extraction section 30. Meanwhile, in a case where the image is a target domain training image, it may be inputted to the target domain feature quantity extraction section 40.

Subsequently, the feature quantity extraction section 72 outputs feature quantity data corresponding to the image inputted in step S202 (step S203).

Next, the dividing section 50 divides the feature quantity data outputted from the feature quantity extraction section 72 in step S203 into a plurality of pieces of partial feature quantity data (step S204).

Then, the domain identification learning section 76 identifies an output that is generated when each of the plurality of pieces of partial feature quantity data generated in step S204 is inputted to the domain identification section 56 (step S205). In this instance, for example, all the pieces of partial feature quantity data generated in step S204 may be inputted to the common domain identification section 56 as mentioned earlier. Alternatively, partial feature quantity data corresponding to a specific class may be inputted to a subdomain identification section associated with the specific class.

Next, the domain identification learning section 76 compares the output identified in step S205 with domain identification data corresponding to the identified output (step S206). In this instance, for example, the earlier-mentioned objective function value L2(i) and the value L3 corresponding to that value L2(i) may be calculated.

Subsequently, the domain identification learning section 76 determines whether the value of the variable r2 is an even value or an odd value (step S207).

In a case where the value of the variable r2 is an odd number, the domain identification learning section 76 executes training of the target domain feature quantity extraction section 40 in accordance with the result of the comparison made in step S206 (step S208). In this instance, for example, the values of parameters of elements included in the target domain feature quantity extraction section 40 are updated. In this case, the values of parameters of elements included in the source domain feature quantity extraction section 30 and the domain identification section 56 remain unchanged in step S208.

In a case where the value of the variable r2 is an even number, the domain identification learning section 76 executes training of the domain identification section 56 in accordance with the result of the comparison made in step S206 (step S209). In this instance, for example, the values of parameters of elements included in the domain identification section 56 are updated. In this case, the values of parameters of elements included in the source domain feature quantity extraction section 30 and the target domain feature quantity extraction section 40 remain unchanged in step S209.

Next, the domain identification learning section 76 determines whether or not the value of the variable q4 is smaller than q3 (step S210). In a case where the value of the variable q4 is smaller than q3 ("Y" at step S210), the domain identification learning section 76 increases the value of the variable q4 by one (step S211), and then returns to step S202.

In a case where the value of the variable q4 is not smaller than q3 ("N" at step S210), the domain identification learning section 76 determines whether or not the value of the variable r2 is smaller than r1 (step S212). In a case where the value of the variable r2 is smaller than r1 ("Y" at step S212), the domain identification learning section 76 sets the value 1 as the value of the variable q4, increases the value of the variable r2 by one (step S213), and then returns to step S202.

Figure 7:
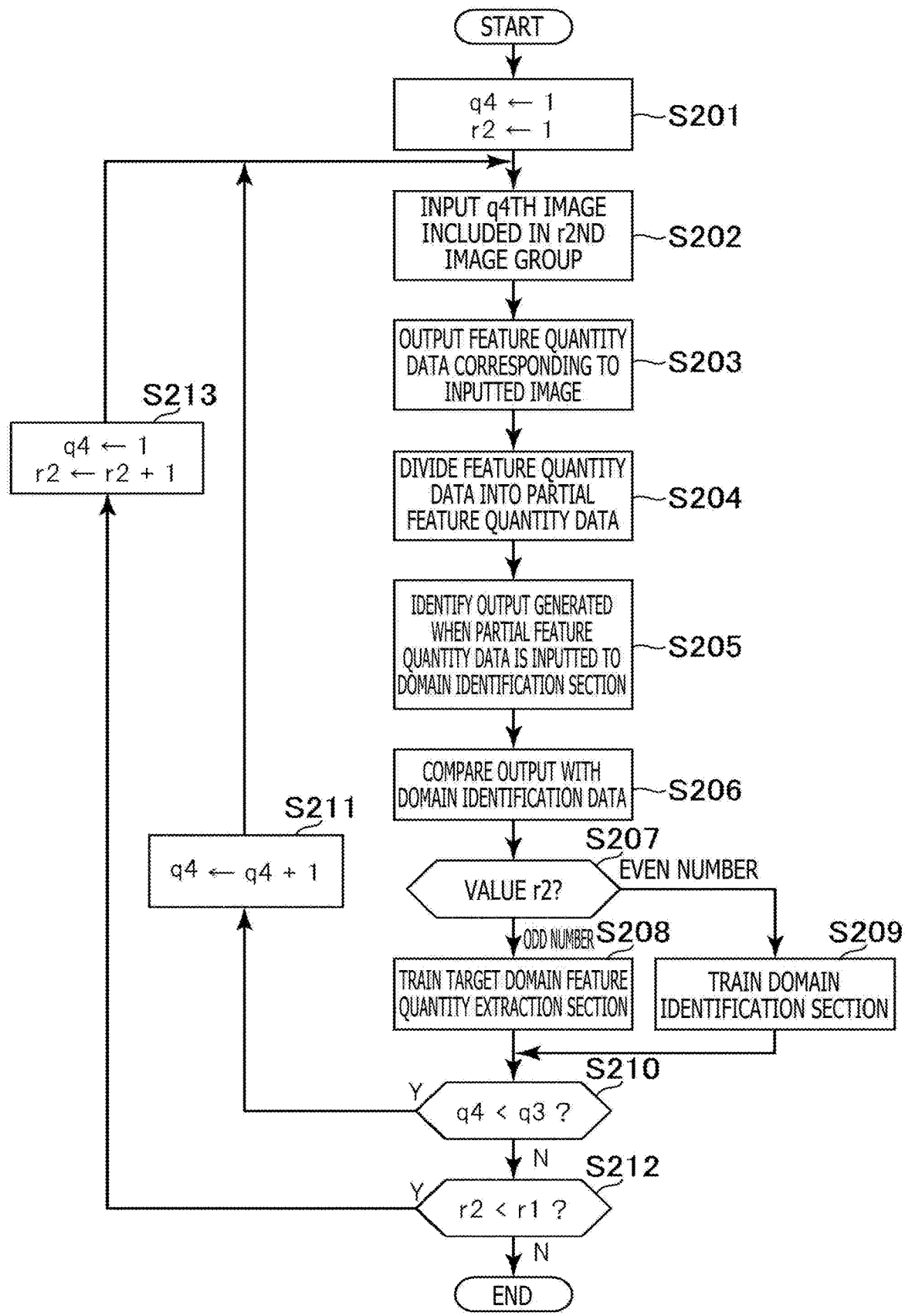
FIG. 7 is a flowchart illustrating an example of a process for domain identification learning conducted in the image processing apparatus according to the embodiment of the present invention.

In a case where the value of the variable r2 is not smaller than r1 ("N" at step S212), the example of the process depicted in FIG. 7 ends.

As described above, the example of the process depicted in FIG. 7 alternately executes the training of the target domain feature quantity extraction section 40 based on q3 images and the training of the domain identification section 56 based on q3 images.

An example of an application of domain adaptation will now be described.

Figure 8:
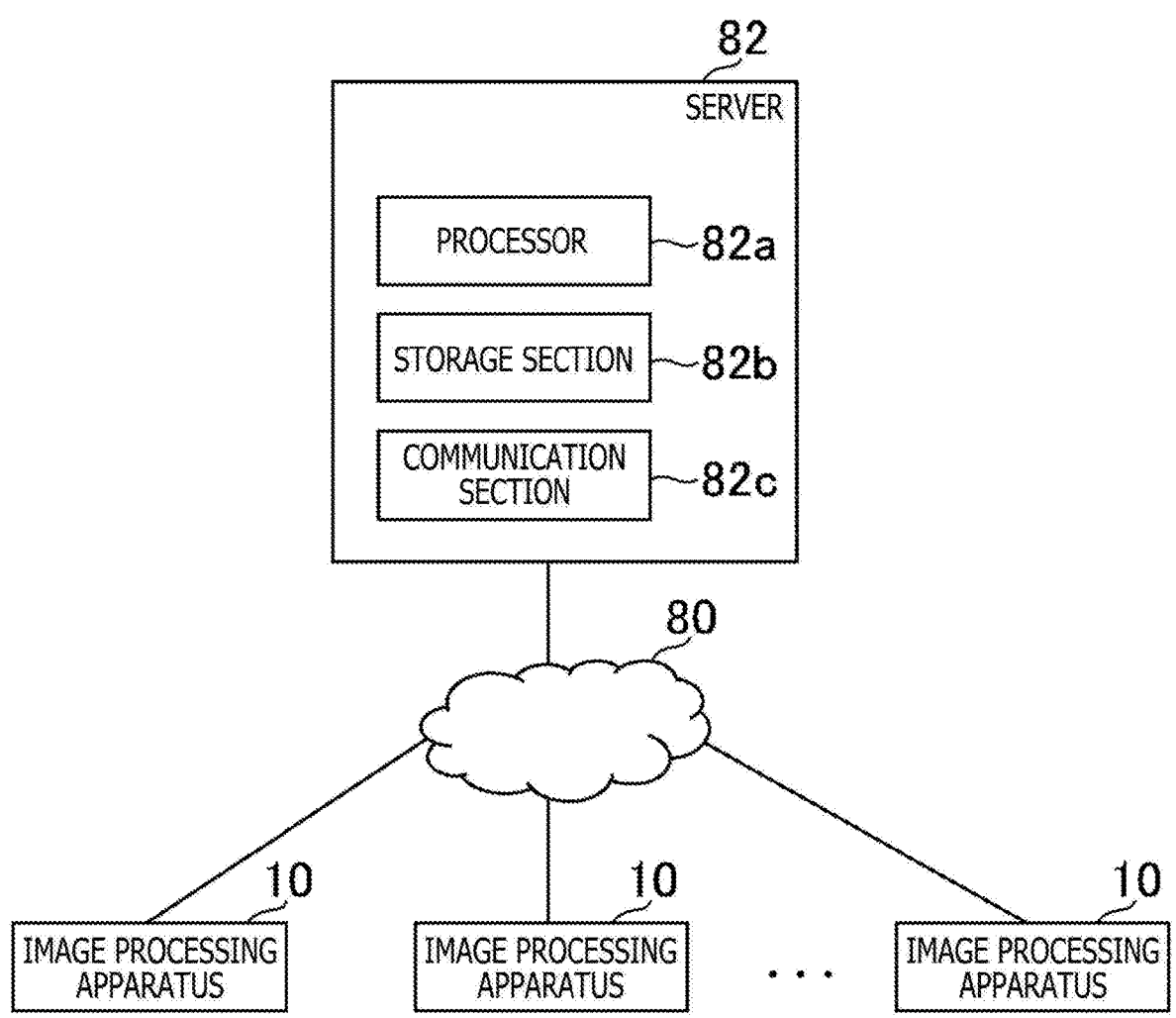
FIG. 8 is a diagram illustrating a configuration of a system for generating a captured image classification apparatus according to the embodiment of the present invention.

FIG. 8 is a diagram illustrating a configuration of a system for generating a captured image classification apparatus in accordance with an example of an application of domain adaptation. As depicted in FIG. 8, the system for generating a captured image classification apparatus in accordance with the present example of the application includes a server 82 and a plurality of image processing apparatuses 10. The server 82 and the image processing apparatuses 10 are able to communicate with each other through a computer network 80 such as the Internet.

The image processing apparatuses 10 depicted in FIG. 8 each include, for example, the processor 12, the storage section 14, the operating section 16, the display section 18, and the communication section 20, as mentioned earlier.

The server 82 includes a processor 82a, a storage section 82b, and a communication section 82c. The processor 82a is a CPU or another program control device that operates in accordance, for example, with a program installed in the server 82. The storage section 82b is, for example, a hard disk drive or a storage element such as a ROM or a RAM. The storage section 82b stores, for example, a program that is to be executed by the processor 82a. The communication section 82c is, for example, a communication interface such as a network board or a wireless LAN module.

In the present example of the application, the server 82 transmits, for example, a machine learning model trained by a CG image to each of the plurality of image processing apparatuses 10. In the present case, for example, one machine learning model (common machine learning model) is transmitted to each of the plurality of image processing apparatuses 10. Each of the plurality of image processing apparatuses 10 then acquires the machine learning model transmitted from the server 82. The machine learning model corresponds to the source domain feature quantity extraction section 30 and classification section 32 that are already subjected to classification learning based, for example, on a CG image. In the present example of the application, for example, the source domain feature quantity extraction section 30 outputs feature quantity data including a feature map corresponding to each of a given plurality of classes in accordance with an input of a CG image. Then, in accordance with an input of the feature quantity data, the classification section 32 outputs the result of a process of classifying the CG image inputted to the source domain feature quantity extraction section 30 into the plurality of classes. In this instance, the image processing apparatuses 10 may receive a machine learning model subjected to the above-mentioned learning from a server that is capable of communicating with the image processing apparatuses 10 through the communication section 20.

Then, in each of the plurality of image processing apparatus 10, the domain identification learning section 76 may execute domain identification learning in accordance with the CG image, with an image captured in the environment of a user using the image processing apparatus 10, and with the received machine learning model subjected to learning. The CG image used in this instance for domain identification learning may be a CG image that is used to learn the machine learning model received from the server 82. Further, for example, domain identification learning may be conducted to train the target domain feature quantity extraction section 40 that outputs feature quantity data including a feature map corresponding to each of a given plurality of classes in accordance with an input of an image captured by the user.

Subsequently, the image processing apparatus 10 may generate a captured image classification apparatus that executes a process of classifying, into a plurality of classes, an image captured in the environment of the user using the image processing apparatus 10. In such an instance, the captured image classification apparatus may be generated in accordance, for example, with a trained target domain feature quantity extraction section 40 and with a trained classification section 32 included in the acquired machine learning model. Subsequently, the captured image classification apparatus generated in the above-described manner may be used to execute a process of classifying an image captured in the user's environment into a plurality of classes.

Implementation of domain identification learning for generating the captured image classification apparatus, which has been described above, is not limited to an example of implementation described with reference to FIGS. 2 to 7. Domain identification learning for generating the captured image classification apparatus may be executed by performing an implementation different from the implementation described with reference to FIGS. 2 to 7.

When the above-described scheme is used, it is possible to generate a captured image classification apparatus that is adapted to the environment of each of a plurality of users and configured to execute a process of classifying a captured image into a plurality of classes by using one machine learning model trained by a CG image.

Functions for generating the captured image classification apparatus in accordance with the above-described example of the application may be implemented by allowing the processor 12 to execute a program that includes commands associated with the above functions and is installed in the server 82 or the image processing apparatus 10, which are both computers. The program may be supplied to the server 82 or the image processing apparatus 10 through the Internet or through a computer-readable information storage medium, such as an optical disk, a magnetic disk, a magnetic tape, a magneto-optical disk, or a flash memory.

It should be noted that the present invention is not limited to the above-described embodiment.

Further, the above-mentioned specific character strings and numerical values, and specific character strings and numerical values in the accompanying drawings are illustrative and not restrictive.

The invention claimed is:

1. A learning apparatus that executes training of a classification apparatus including a feature quantity extraction section and a classification section, the feature quantity extraction section outputting feature quantity data including a feature map corresponding to each of a given plurality of classes in accordance with an input of an image, the classification section outputting a result of a process of classifying the image into the plurality of classes in accordance with an input of the feature quantity data, the learning apparatus comprising:
   a classification learning section that executes training of the feature quantity extraction section and training of the classification section in accordance with a result of comparison between an output generated when the feature quantity data is inputted to the classification section and training data regarding the plurality of classes associated with the classification training image, the feature quantity data being outputted from the feature quantity extraction section in accordance with an input of a classification training image belonging to a source domain;
   a dividing section that divides the feature quantity data into a plurality of pieces of partial feature quantity data corresponding to the domain training image, the feature quantity data being outputted from the feature quantity extraction section in accordance with an input of a domain training image belonging to either the source domain or a target domain, the domain training image including the feature map of one of or a plurality of the classes; and
   a domain identification learning section that executes training of the feature quantity extraction section in accordance with a result of comparison between an output generated when the partial feature quantity data corresponding to the domain training image is inputted to a domain identification section and data indicating whether the domain training image belongs to the source domain or the target domain, the domain identification section distinguishing between an image belonging to the source domain and an image belonging to the target domain.

2. The learning apparatus according to claim 1, wherein the domain identification learning section executes the training of the feature quantity extraction section in accordance with a weighted sum of objective function values corresponding to an output that is generated when each of a plurality of pieces of the partial feature quantity data is inputted to the domain identification section.

3. The learning apparatus according to claim 1, wherein the domain identification section includes a plurality of subdomain identification sections that respectively correspond to the plurality of pieces of the partial feature quantity data obtained by division by the dividing section, and
   the domain identification learning section executes the training of the feature quantity extraction section in accordance with an output that is generated when the partial feature quantity data is inputted to the subdomain identification sections corresponding to the partial feature quantity data.

4. A system for generating a captured image classification apparatus, the system comprising:

a server; and a plurality of apparatuses, wherein the server includes a transmission section that transmits a machine learning model trained by a computer graphics image to each of the plurality of apparatuses, the machine learning model including a feature quantity extraction section and a classification section, the feature quantity extraction section outputting feature quantity data including a feature map corresponding to each of a given plurality of classes in accordance with an input of the computer graphics image, the classification section outputting a result of a process of classifying, into the plurality of classes, an image that is inputted to the feature quantity extraction section in accordance with an input of the feature quantity data, and each of the plurality of apparatuses includes a reception section that receives the machine learning model transmitted from the server, a learning section that executes training of a captured image feature quantity extraction section in accordance with an image captured in an environment of a respective user using a given one of the plurality of apparatuses and with the trained machine learning model, the captured image feature quantity extraction section outputting feature quantity data including a feature map corresponding to each of a given plurality of classes in accordance with an input of the image captured in the environment of the user, and a generation section that generates a captured image classification apparatus in accordance with the trained captured image feature quantity extraction section and with the trained classification section included in the machine learning model, the captured image classification apparatus executing a process of classifying the image captured in the environment of the user into the plurality of classes.

5. An apparatus for generating a captured image classification apparatus, the apparatus comprising:

a reception section that receives a machine learning model that is trained by a computer graphics image and transmitted from a server, the machine learning model including a feature quantity extraction section and a classification section, the feature quantity extraction section outputting feature quantity data including a feature map corresponding to each of a given plurality of classes in accordance with an input of the computer graphics image, the classification section outputting a result of a process of classifying, into the plurality of classes, an image that is inputted to the feature quantity extraction section in accordance with an input of the feature quantity data;

a learning section that executes training of a captured image feature quantity extraction section in accordance with an image captured in an environment of a user and with the trained machine learning model, the captured image feature quantity extraction section outputting feature quantity data including a feature map corresponding to each of a given plurality of classes in accordance with an input of the image captured in the environment of the user; and a generation section that generates a captured image classification apparatus in accordance with the trained captured image feature quantity extraction section and with the trained classification section included in the machine learning model, the captured image classification apparatus executing a process of classifying the image captured in the environment of the user into the plurality of classes.

6. A learning method for executing training of a classification apparatus that includes a feature quantity extraction section and a classification section, the feature quantity extraction section outputting feature quantity data including a feature map corresponding to each of a given plurality of classes in accordance with an input of an image, the classification section outputting a result of a process of classifying the image into the plurality of classes in accordance with an input of the feature quantity data, the learning method comprising:

executing training of the feature quantity extraction section and training of the classification section in accordance with a result of comparison between an output generated when the classification section inputs the feature quantity data outputted from the feature quantity extraction section in accordance with an input of a classification training image belonging to a source domain and training data regarding the plurality of classes associated with the classification training image;

dividing the feature quantity data into a plurality of pieces of partial feature quantity data corresponding to the domain training image including the feature map of one of or a plurality of the classes, the feature quantity data being outputted from the feature quantity extraction section in accordance with an input of a domain training image belonging to either the source domain or a target domain; and executing training of the feature quantity extraction section in accordance with a result of comparison between an output generated when the partial feature quantity data corresponding to the domain training image is inputted to a domain identification section and data indicating whether the domain training image belongs to the source domain or the target domain, the domain identification section distinguishing between an image belonging to the source domain and an image belonging to the target domain.

7. A non-transitory, computer-readable storage medium containing a computer program, which when executed by a computer, causes the computer to execute training of a classification apparatus that includes a feature quantity extraction section and a classification section, the feature quantity extraction section outputting feature quantity data including a feature map corresponding to each of a given plurality of classes in accordance with an input of an image, the classification section outputting a result of a process of classifying the image into the plurality of classes in accordance with an input of the feature quantity data, the computer program causing the computer to execute actions, comprising:

executing training of the feature quantity extraction section and training of the classification section in accordance with a result of comparison between an output generated when the classification section inputs the feature quantity data outputted from the feature quantity extraction section in accordance with an input of a classification training image belonging to a source domain and training data regarding the plurality of classes associated with the classification training image;

dividing the feature quantity data into a plurality of pieces of partial feature quantity data corresponding to the domain training image including the feature map of one of or a plurality of the classes, the feature quantity data being outputted from the feature quantity extraction section in accordance with an input of a domain training image belonging to either the source domain or a target domain; and executing training of the feature quantity extraction section in accordance with a result of comparison between an output generated when the partial feature quantity data corresponding to the domain training image is inputted to a domain identification section and data indicating whether the domain training image belongs to the source domain or the target domain, the domain identification section distinguishing between an image belonging to the source domain and an image belonging to the target domain.

* * * * *